(12) United States Patent
Kale et al.

(10) Patent No.: US 11,110,960 B2
(45) Date of Patent: Sep. 7, 2021

(54) CROSS MEMBER AND CROSS MEMBER ASSEMBLY FOR A VEHICLE FRAME

(71) Applicant: Metalsa India Private Limited, New Delhi (IN)

(72) Inventors: Ganesh Gulab Kale, Pune (IN); Kaushal Rajiv Gokhale, Pune (IN)

(73) Assignee: Metalsa India Private Limited

(*) Notice: Subject to any disclaimer, the term of this patent is extended or adjusted under 35 U.S.C. 154(b) by 53 days.

(21) Appl. No.: 16/641,494

(22) PCT Filed: Aug. 23, 2018

(86) PCT No.: PCT/IN2018/050543
§ 371 (c)(1),
(2) Date: Feb. 24, 2020

(87) PCT Pub. No.: WO2019/038788
PCT Pub. Date: Feb. 28, 2019

(65) Prior Publication Data
US 2021/0078635 A1 Mar. 18, 2021

(30) Foreign Application Priority Data
Aug. 25, 2017 (IN) .............................. 201711030125

(51) Int. Cl.
*B62D 21/03* (2006.01)
*B62D 27/06* (2006.01)

(52) U.S. Cl.
CPC ............. *B62D 21/03* (2013.01); *B62D 27/06* (2013.01)

(58) Field of Classification Search
CPC ......... B62D 21/03; B62D 27/06; B62D 21/02
USPC ......................................................... 296/204
See application file for complete search history.

(56) References Cited

U.S. PATENT DOCUMENTS

| 3,000,650 A * | 9/1961 | Burrows | B62D 21/06 280/793 |
| 2007/0256881 A1* | 11/2007 | Ball | B62D 31/003 180/312 |
| 2014/0252807 A1* | 9/2014 | Medina | B62D 65/00 296/204 |
| 2020/0255068 A1* | 8/2020 | De Smidt | B62D 33/077 |

* cited by examiner

*Primary Examiner* — Pinel E Romain
(74) *Attorney, Agent, or Firm* — Lerner, David, Littenberg, Krumholz & Mentlik, LLP

(57) ABSTRACT

The present invention provides for cross members and cross member assembly for use in vehicle chassis. The present invention also provides for a process of manufacture of cross member and cross member assembly for use in vehicle chassis. The cross member and cross member assembly facilitates a reduction in the weight of the chassis and the weight of the vehicle, reduction in number of parts, flexibility, modularity, and assembly time of the chassis and the vehicle.

31 Claims, 8 Drawing Sheets

CROSS MEMBER AND CROSS MEMBER ASSEMBLY FOR A VEHICLE FRAME

CROSS-REFERENCE TO RELATED APPLICATIONS

The present application is a national phase entry under 35 U.S.C. § 371 of International Application No. PCT/IN2018/050543 filed Aug. 23, 2018, which claims priority from Indian Application No. 201711030125 filed Aug. 25, 2017, all of which are incorporated herein by reference.

FIELD OF THE INVENTION

The present invention generally relates to vehicle frame assemblies, and more particularly to an improved cross member, and cross member assembly for use in a commercial vehicle chassis.

BACKGROUND OF THE INVENTION

A chassis is one of the most critical parts of a vehicle as it carries out multifarious functions. For example, a chassis supports load of passengers or goods carried in the body of the vehicle. Further, the chassis supports the load of the body, engine, gear box and other parts of the vehicle, protects certain internal parts of the vehicle, and but not limited to, withstands forces caused due to sudden braking or acceleration or stresses caused due to bad road conditions.

Of the different types of chassis, ladder frame chassis may be considered as the simplest and oldest of the chassis frame assembly type. Ladder frame chassis resembles ladders such that two parallel side rails run along the length of the vehicle and several cross members are used to connect the side rails.

Conventionally, cross members are single independent units which are attached to the side rails using components such as gussets and reinforcements (as demonstrated in FIG. 1). Yet further, in certain vehicles, cross members are supported against the side rails of the frame via other structural members for impact absorption. Consequently, the additional hardware components not only result in increase in the weight of the chassis but in turn also results in an increase in the weight of the vehicle. Further, assembly time and cost also increase due to the additional hardware components.

In light of the above drawbacks, there is a need for an improved cross member and cross member assembly which is secured to a vehicle frame without additional components. There is a need for a cross member and cross member assembly that can be secured to any type of vehicle frame directly, and yet provide the necessary rigidity. Also, there is a need for a cross member and cross member assembly that leads to reduced chassis weight and faster chassis assembly time. Further, there is a need for a cross member assembly which is flexibly deployable at different locations of a frame of any vehicle type. Therefore, there is a need for a process of manufacture of a cross member and cross member assembly which provides the required strength at specific regions without hampering overall performance of the chassis frame.

SUMMARY OF THE INVENTION

In various embodiments of the present invention, an improved cross member 202, 204 is provided. The cross member 202, 204 comprises at least two heat-treated end-regions 202a, 202b, 204a, 204b. At least two side faces 202g, 202h, 204g, 204h are disposed perpendicularly to top faces 202j, 204j of the cross members 202, 204 for surface to surface fitting of the cross members 202, 204 to inner sides of side rails of a vehicle. The at least two end-regions 202a, 202b, 204a, 204b are heat-treated such that the heat-treated end regions 202a, 202b, 204a, 204b of the cross member 202, 204 are extendable to a predetermined portion of the total length of the cross member 202, 204 such that the strength of the end-regions 202a, 202b, 204a, 204b is adaptable to the required yield strength of the cross members 202, 204 for directly and securely fitting onto the side rails of the vehicle.

In various embodiments of the present invention, an improved cross member assembly 302 is provided. The cross member assembly 302 comprises at least two cross members 304, 306 coupled such that the cross member 304 is disposed in a direction facing corresponding parts of the cross member 306. The at least two cross members 304, 306 are configured to accommodate joining plates 308 across top flange surfaces 304a, 306a and bottom flange surfaces 304b, 306b.

BRIEF DESCRIPTION OF THE DRAWINGS

The present invention is described by way of embodiments illustrated in the accompanying drawings wherein.

DETAILED DESCRIPTION OF THE INVENTION

In various embodiments of the present invention, design and process of manufacture of cross member and cross member assembly is provided. The invention provides for an improved cross member and cross member assembly which eliminates the need for additional components such as gussets, reinforcements and other supporting members for attaching the cross members to side rails of a ladder frame chassis. The cross member and cross member assembly of the present invention exhibits an increase in strength required for securely fitting to the side rails of the ladder frame chassis directly. As a consequence, weight of the chassis and therefore weight of the vehicle decreases. Further, assembly time as well as cost of deployment is also reduced. Furthermore, the cross member and cross member assembly is designed to adapt to different locations of the chassis of any vehicle type by providing for provisions to accommodate various kinds of peripheral mounting plates and aggregates, which leads to reduction in number of parts and offers flexibility and modularity. The invention further provides for reduction in efforts and issues in stamping high strength materials for manufacturing cross members, and provides a cross-member assembly which is economical and easily deployable with various vehicle types used for various applications.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present disclosure.

Figure 1:
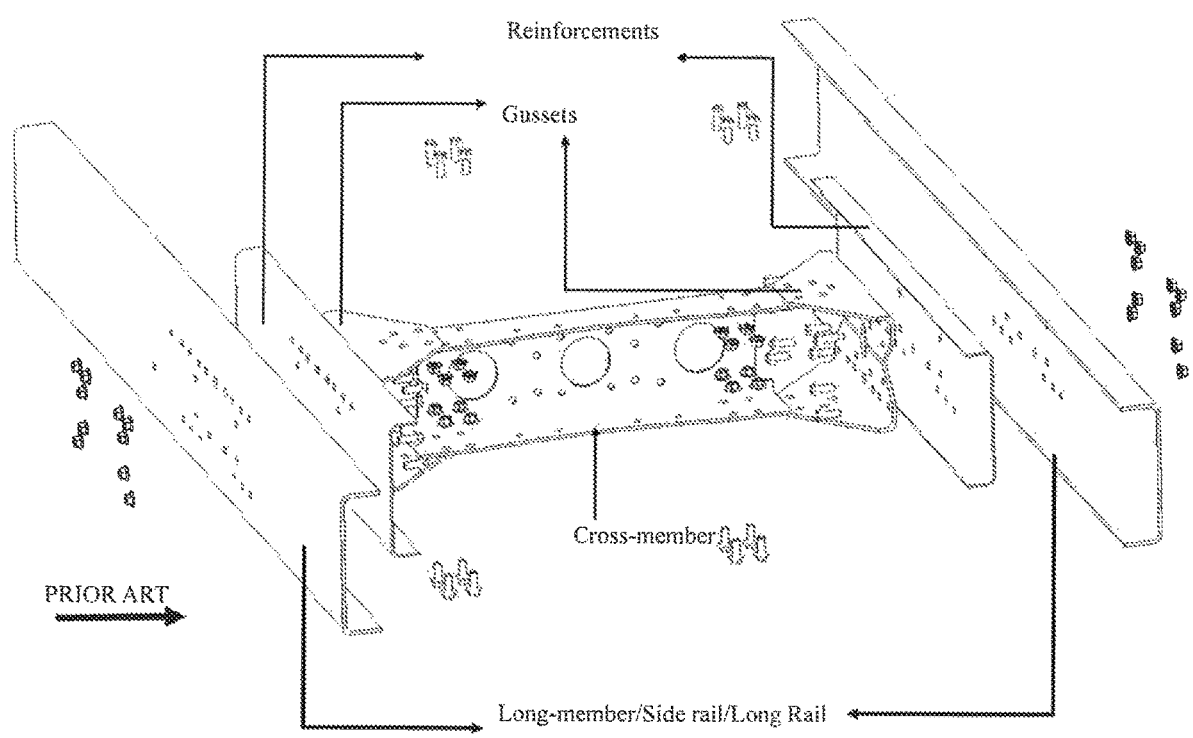
FIG. 1 illustrates a prior art cross member.
Figure 2:
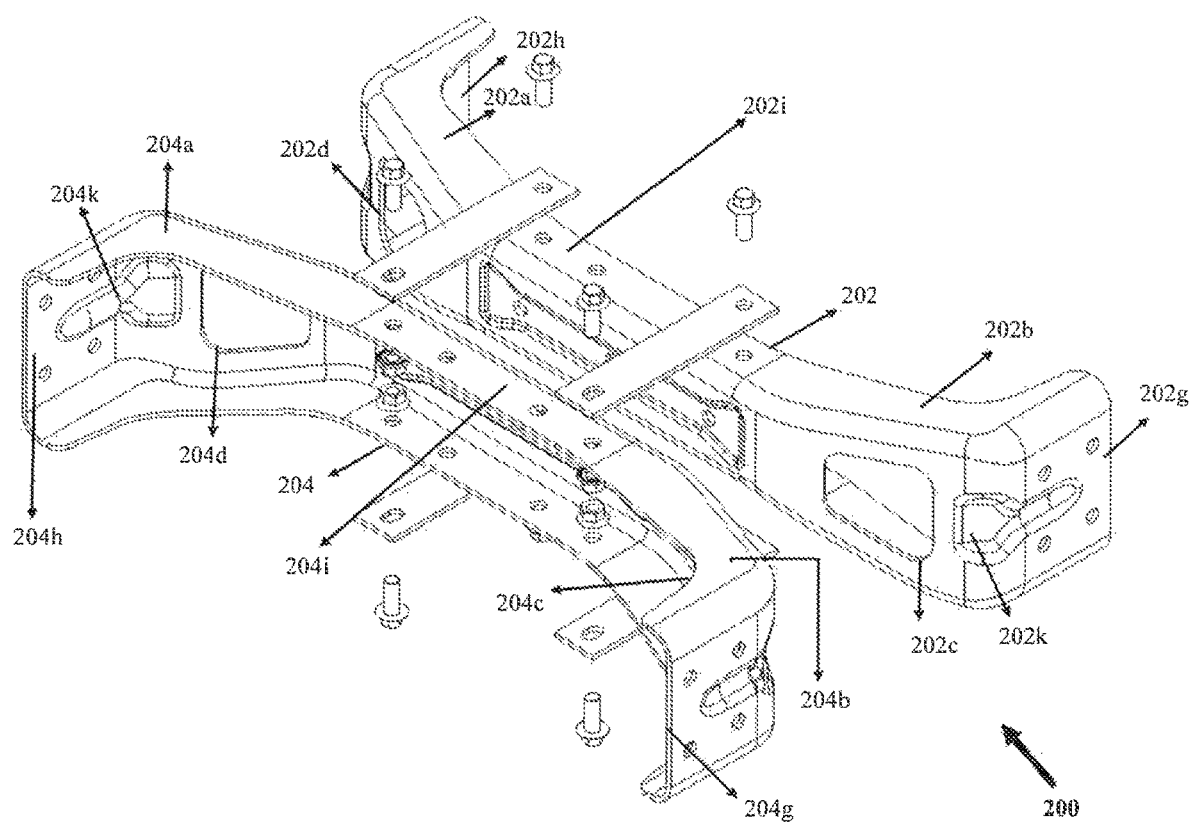
FIG. 2 and FIG. 2A illustrates cross members in accordance with various embodiments of the present invention.

FIG. 2 illustrates cross members in accordance with various embodiments of the present invention.

A cross member is a structural member which is disposed transversely between two side rails in a ladder frame chassis. In an embodiment of the present invention, cross members are used in a ladder frame chassis of various types of vehicles, such as, commercial vehicles which are used for transporting goods and passengers. Examples of commercial vehicles include trucks, busses, paid taxis and the like, which are typically classified as light, medium and heavy commercial vehicles based on the gross weight of the vehicles. FIG. 2 depicts the structural design of the cross members 202, 204 in accordance with various embodiments of the present invention. For deployment in a vehicle, at least two cross members 202, 204 are coupled using a coupling mechanism to form a cross member assembly in accordance with various embodiments of the present invention, as discussed in later part of the specification. The cross member assembly may be mounted between two side rails of a ladder frame chassis of the vehicle employing a joining mechanism in accordance with various embodiments of the present invention which is discussed in later part of the disclosure.

Figure 2A:
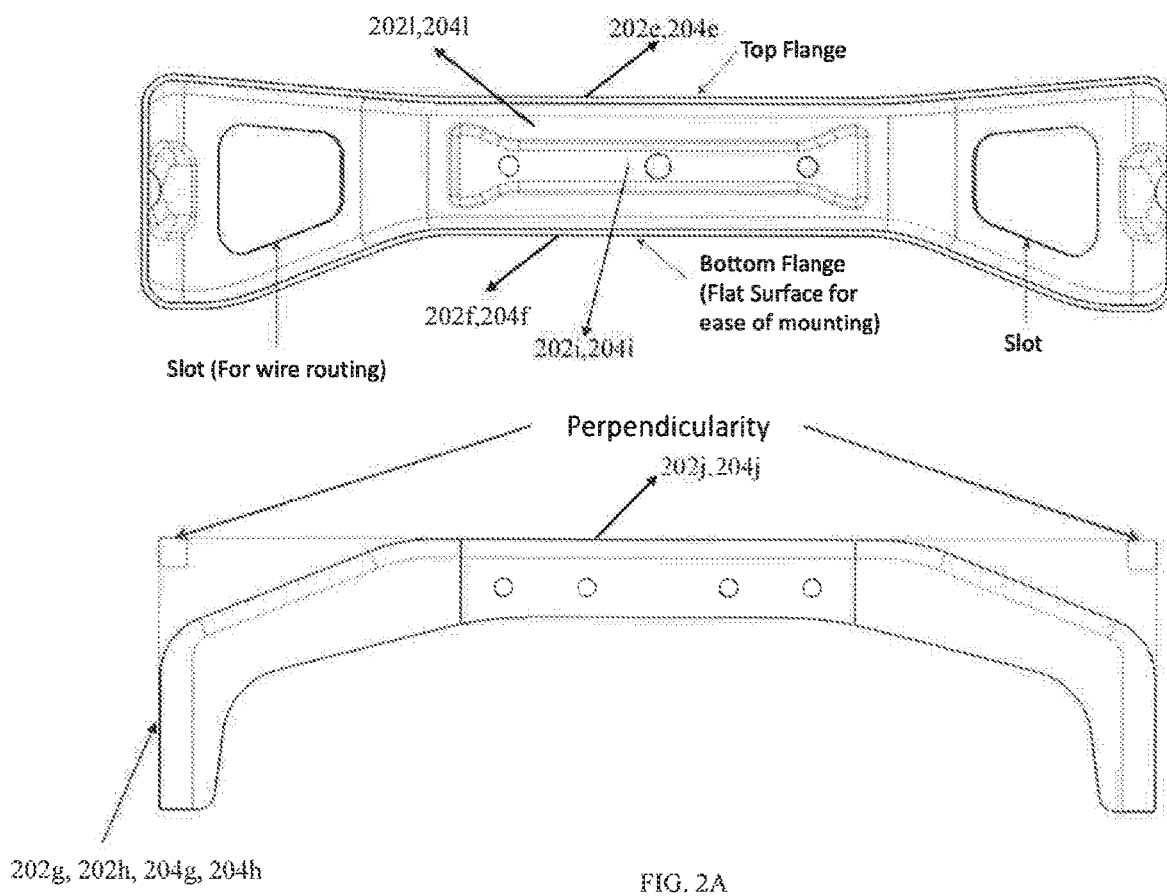
Figure 2B:
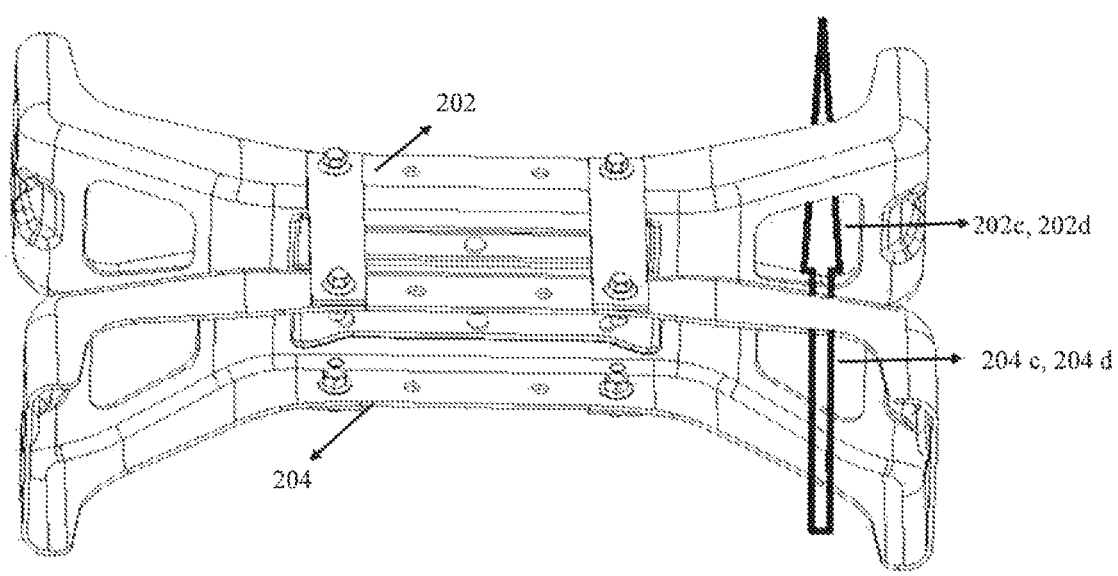
FIG. 2B illustrates passage for routing connecting components through slots provided in the cross members, in accordance with various embodiments of the present invention.
Figure 2C:
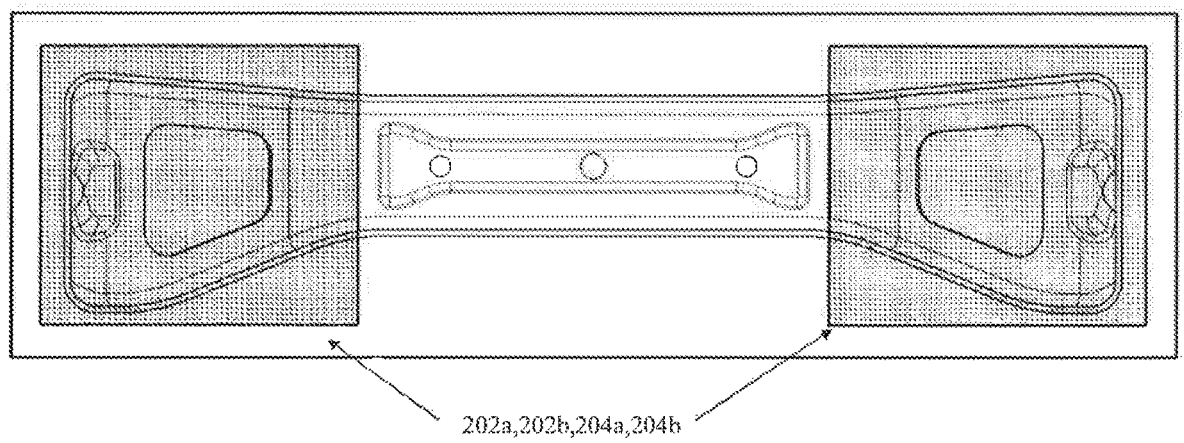
FIG. 2C illustrates heat treated end-regions of a cross member, in accordance with various embodiments of the present invention.

Referring back to FIG. 2, in an embodiment of the present invention, the design of the cross members 202, 204 include two end-regions 202a, 202b, 204a, 204b (as also shown in FIG. 2C), respectively. A slot 202c, 202d, 204c, 204d is disposed at each of the two end-regions 202a, 202b, 204a, 204b of the cross members 202, 204. The slots 202c, 202d, 204c, 204d are designed in the cross members 202, 204 such that in the event the cross members 202, 204 are positioned for coupling, the slots 202c, 202d, 204c, 204d provide for a passage for routing wires, brake pipes, fuel pipes and any other connecting components (as shown in FIG. 2B). The cross members 202, 204 include a top flange surface 202e, 204e and a bottom flange surface 202f, 204f disposed at the periphery of the top and bottom faces 202j, 204j, 2021, 2041 of the cross members 202, 204 respectively (as shown in FIG. 2A). The top and bottom flange surfaces 202e, 202f, 204e, 204f are flat surfaces disposed parallelly with respect to each other in the cross members 202, 204 (as shown in FIG. 2A). The flat and parallel surfaces of the top and bottom flanges 202e, 202f, 204e, 204f of the cross members 202, 204 provide ease of mounting of various peripheral aggregates on the cross members 202, 204. The side faces 202g, 202h, 204g, 204h of the cross members 202, 204 are perpendicular to the top faces 202j, 204j, respectively, to facilitate surface to surface fitting of the cross members 202, 204 to the inner side of the side rails (as also shown in FIG. 2A). The mid-regions 202i, 204i of the cross members 202, 204 between the end-regions 202a, 202b, 204a, 204b are provided with holes which provides for a common reference point for use in tooling and manufacturing processes (as also shown in FIG. 2A). Further, overall length of the cross members 202, 204 is ascertained based on distance between the two side rails on which the cross members 202, 204 are mounted. Width of the cross members 202, 204 may also be varied based on load carrying capacity and performance characteristics of the vehicle on which the cross members 202, 204 are deployed. In an exemplary embodiment of the present invention, the overall length of the cross members 202, 204 is 500 to 1,000 mm and the width of the cross members 202, 204 is in the range of 110 to 300 mm.

In an embodiment of the present invention, the raw material of which the cross members 202, 204 are made is a customized steel. Examples of steel may include, but is not limited to, a low carbon steel, and a medium carbon steel. In an exemplary embodiment of the present invention, the composition of the steel used in the making of the cross member is characterized by suitable alloying elements added to achieve the required mechanical properties. The inherent strength of the steel preferably ranges between 300 to 700 MPa.

In an embodiment of the present invention, the cross members 202, 204 are manufactured through a partial draw stamping process. Stamping is a process for forming the cross members 202, 204 into a predetermined desired shape during the manufacturing process. The said stamping process is flexible to accommodate variations in overall length of the cross members 202, 204 according to changes in chassis width. The cross members 202, 204 are provided with Y-shaped depressions 202k, 204k at the end-regions 202a, 202b, 204a, 204b of the cross members 202, 204 to ease the stamping process.

By application of heat treatment in the manner described herein below, requisite strength at the end-regions 202a, 202b, 204a, 204b of the cross members 202, 204 is achieved. In particular, material properties in specific regions of the cross members 202, 204 are improved and desired properties are produced after application of the heat treatment in accordance with the present invention. The end-regions 202a, 202b, 204a, 204b of the cross members 202, 204 are subjected to heat treatment in order to improve the strength of the regions which are critical in field application. In various embodiments of the present invention, the heat treatment process can be conducted by using conductive, convective or induction heat treatment based on performance requirements of the cross members 202, 204. In an embodiment of the present invention, the heat treatment process may be a comprehensive heat treatment process which is a complete heat treatment process. In another embodiment of the present invention, the heat treatment process may be a targeted or selective heat treatment process. Selective heat treatment process is the process for heat-treating a particular region of the cross-members 202, 204.

In an embodiment of the present invention, the process of heat treatment includes but is not limited to the steps provided herein below:

In an exemplary embodiment of the present invention, the process of the selective heat treatment is conducted by using induction coils to heat the end-regions 202a, 202b, 204a, 204b (as shown in FIG. 2C) to a first pre-determined temperature i.e. above austenitizing temperature. The temperature may vary from 850 degree Centigrade to 1,050 degree centigrade. In an exemplary embodiment of the present invention, the preferred range of temperature varies from 900 degree centigrade to 1,000 degree centigrade. In another exemplary embodiment of the present invention, the preferred range of temperature varies from 900 degree centigrade to 950 degree centigrade.

Subsequently, the heat-treated end-regions 202a, 202b, 204a, 204b are rapidly cooled to a second predetermined temperature. The step of cooling is also referred to as quenching and is carried out by at least one method that includes but is not limited to dipping the cross members 202, 204 in a quenchant tank or quenching using a shower. In an exemplary embodiment of the present invention, the heat-treated end-regions 202a, 202b, 204a, 204b are rapidly cooled to room temperature. Parameters such as the cooling rate and the type of quenchant can be adjusted as per the end microstructure requirement and desired mechanical properties after heat treatment.

The cross members 202, 204 are thereafter subjected to a third pre-determined temperature, known as the tempering temperature, to get the desired mechanical properties. The third pre-determined temperature may vary from 300 degree centigrade to 600 degree centigrade and preferably from 400-550 degree centigrade. The third pre-determined temperature is determined on the basis of the hardness and yield strength requirement of the cross members 202, 204 that enables to adjust the strength of the end-regions 202a, 202b, 204a, 204b of the cross members 202, 204 for directly fitting onto the side rails, based on the vehicle type and application.

In various embodiments of the present invention, the cycle of hardening, quenching and tempering may be modified as per the strength requirements of the cross members 202, 204 based on the type of vehicle. In an exemplary embodiment of the present invention, for a tempering temperature of 550 degrees centigrade an unexpected strength of the cross members 202, 204 of 640 MPa is achieved. In another exemplary embodiment of the present invention, for a tempering temperature of 475 degrees centigrade, an unexpected strength of the cross members 202, 204 of 830 MPa is achieved.

In various embodiments of the present invention, the flexibility of heat treatment process allows to vary the stretch as well as the strength of the heat treated region which enables the application of the cross members 202, 204 at different locations in the ladder frame chassis and across various platforms. In an exemplary embodiment of the present invention, the resultant strength of the cross members 202, 204 has been observed to have a unexpected strength ranging from 640 MPa to 1,100 MPa. The heat-treatment process targets specific areas that require an increase in strength to increase the stress-bearing capacity and reduce the chances of failure of the chassis. In the present invention, it has been observed that the low carbon steel of yield strength in the range of 400-600 MPa is increased to 640-1,100 MPa. In an embodiment of the present invention, for a cross member 202, 204 of length "L", the heat-treated end regions 202a, 202b, 204a, 204b of the cross member 202, 204 may be extended to a predetermined portion of the total length of the cross member (202, 204) such that the strength of the end-regions 202a, 202b, 204a, 204b are adaptable to the required yield strength of the cross members 202, 204 for directly fitting onto the side rails of the vehicle. In an exemplary embodiment of the present invention, for a cross member 202, 204 of length "L", in case of selective heat treatment, the heat-treated region can be extended to "L/10". In another exemplary embodiment of the present invention, for a cross member 202, 204 of length "L", in case of selective heat treatment, the heat-treated region may be extended up to "L/2". The heat treated end-regions 202a, 202b, 204a, 204b of the cross-members 202, 204 extends to 235 mm and may be extended up to 400 mm based on application requirement. In another exemplary embodiment of the present invention, in case of comprehensive heat treatment, the heat treated region is "L". Further, it has been observed that after the heat treatment of the cross member 202, 204, elongation of the base material is maintained within 10% to 20%.

Figure 3:
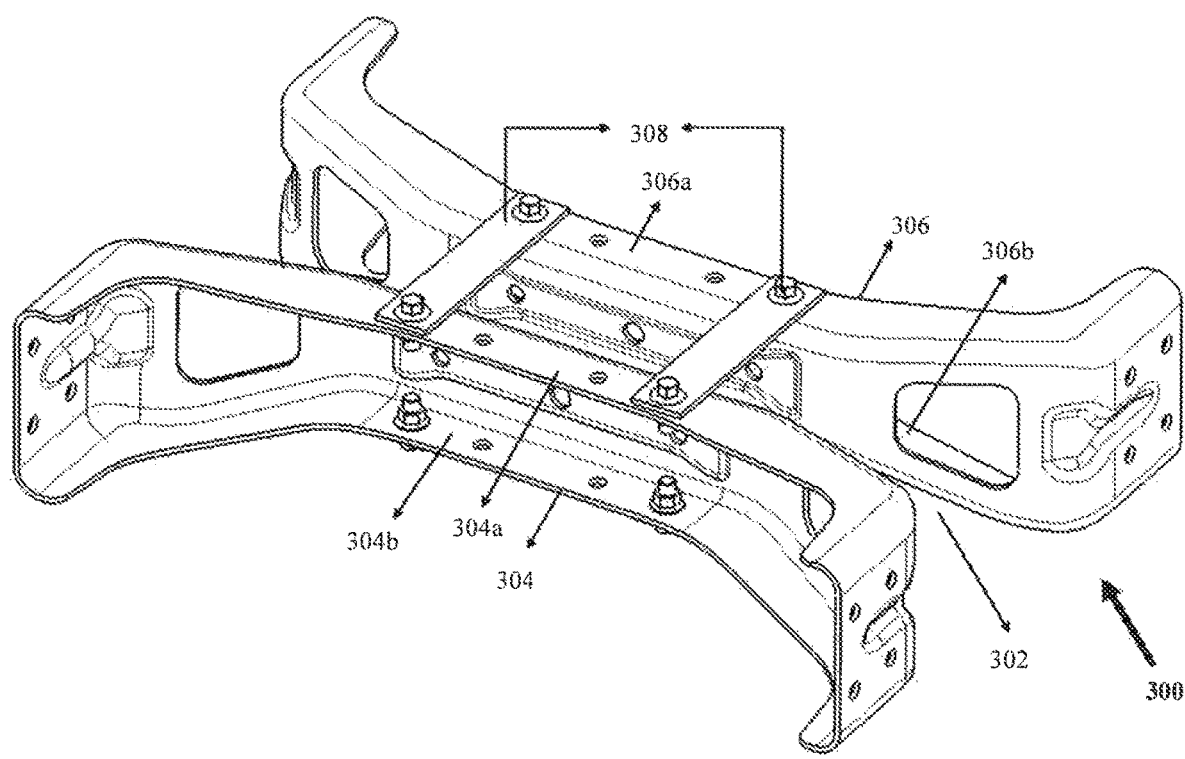
FIG. 3 illustrates a cross-member assembly, in accordance with various embodiments of the present invention.

FIG. 3 illustrates a cross member assembly, in accordance with various embodiments of the present invention.

Figure 3A:
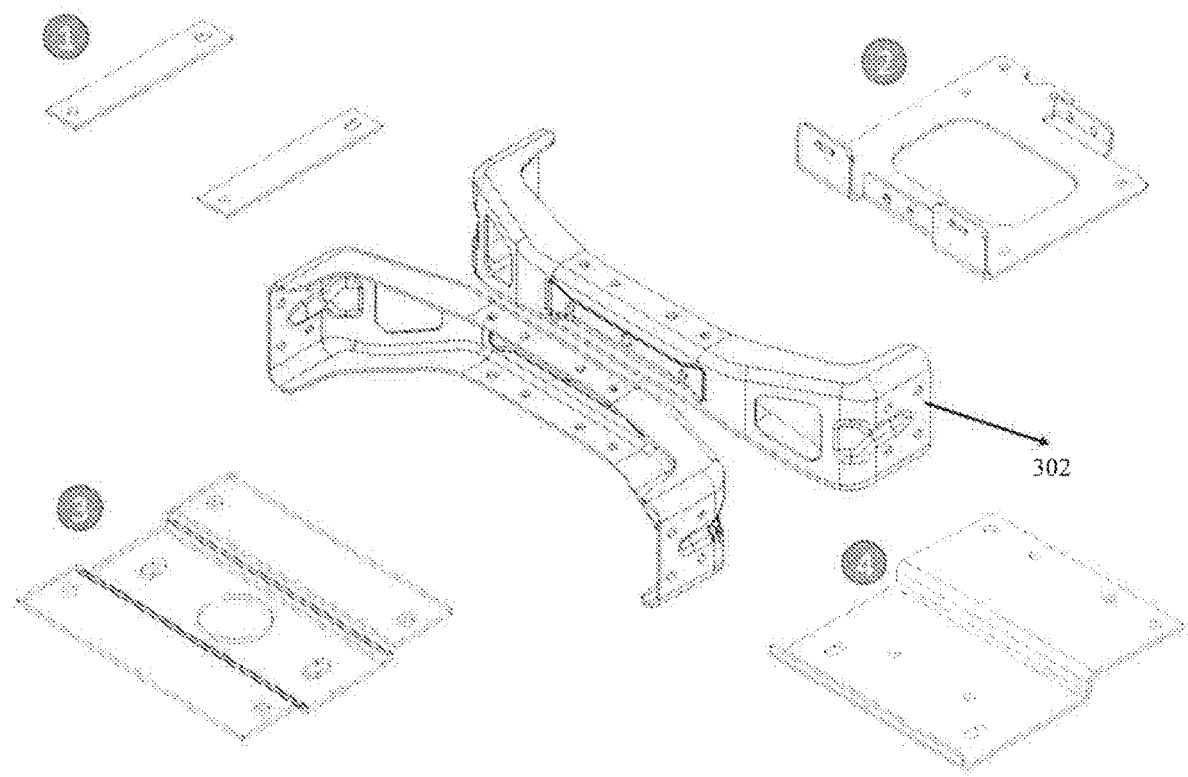
FIG. 3A illustrates a cross member assembly and various peripheral plates mountable on the cross member assembly, in accordance with various embodiments of the present invention.

In various embodiments of the present invention, the cross member assembly 302 is formed by coupling the at least two cross members 304, 306. The cross members 304, 306 are configured to accommodate joining plates 308 across the top flange surfaces 304a, 306a and bottom flange surfaces 304b, 306b. Examples of joining plates 308 may include, but are not limited to, simple plates, cylindrical sleeves, or any other customized mounting plates. The dimensions and position of the joining plates 308 may be varied as per location of deployment of the cross member assembly 302 in the chassis. In an exemplary embodiment of the present invention, the joining plates 308 are secured to the cross members 304, 306 using a bolting mechanism. In another exemplary embodiment of the present invention, the joining plates 308 may be replaced with peripheral aggregates including, but not limited to, prop-shaft bearing, brake valve and the like, which are required for proper functioning of the vehicle (as shown in FIG. 3A).

In an exemplary embodiment of the present invention, the cross-member assembly 302 of the present invention may be used in the chassis of heavy commercial vehicles (HCV). In another exemplary embodiment of the present invention, the cross member assembly 302 may be mounted across chassis of light commercial vehicles (LCV). The cross member assembly 302 may be scaled as per requirements, based on configuration of LCV chassis in which it is deployed.

Figure 3B:
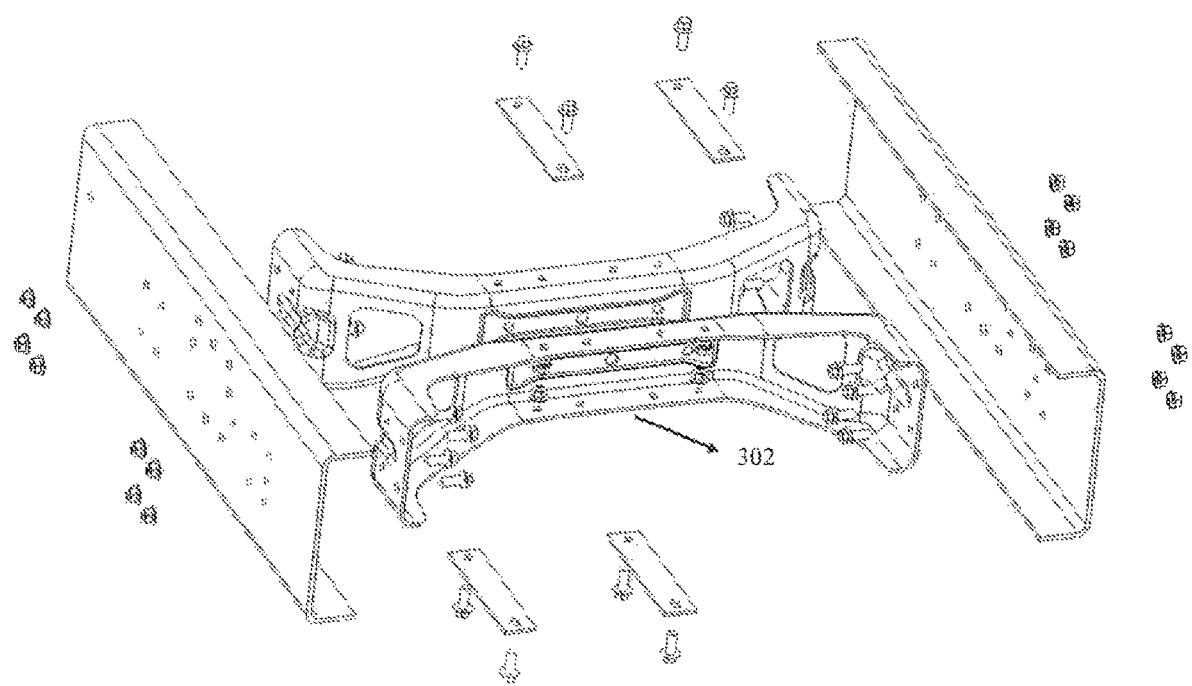
FIG. 3B illustrates a cross-member assembly connected to the side rails of a ladder frame chassis, in accordance with various embodiments of the present invention.

In particular, the cross member assembly 302 may be mounted between two side rails of a ladder frame chassis, (as shown in FIG. 3B). In an embodiment of the present invention, the cross-member assembly 302 is formed by coupling at least two of the cross members 304, 306 such that the cross member 304 is disposed in a direction facing the corresponding parts of the cross member 306. The mechanism of coupling the two cross members 304, 306 may be flexible depending on the dimensions of the ladder frame chassis, location of the cross member assembly 302 in the ladder frame chassis and the type of vehicle for which the ladder frame chassis is designed.

In various embodiments of the present invention, distance between the two cross members 304, 306 in the cross member assembly 302, may be varied based on region of the ladder frame chassis in which the cross member assembly 302 is deployed. The region of the ladder frame chassis determines the distance between the two side rails of the ladder frame chassis. The individual cross members 304, 306 may be scaled as per requirements, based on configuration of the vehicles chassis in which it is deployed. Furthermore, the cross members 304, 306 may be tailored to form the cross member assembly 302 in various configurations based on location of the deployment as well as other structural or functional aggregates that are required to be mounted on the cross member assembly 302.

In an embodiment of the present invention, a standard mechanism such as bolting may be used to support the coupling mechanism. In another exemplary embodiment of the present invention, riveting may also be used as a mechanism to support the coupling mechanism. The design of the cross members 304, 306 and the coupling mechanism to form the cross member assembly 302, therefore, provides for a modularity functionality, in accordance with various embodiments of the present invention. The modularity of the cross members 304, 306 and the cross member assembly 302 is characterized by uniform scaling of its dimensions, thickness to suit the region of deployment in the chassis, the type of vehicle and the application.

Advantageously, the cross members and the cross-member assembly of the present invention may be used very effectively in ladder form chassis. By using the cross member and the cross-member assembly of the present invention, weight of the chassis and therefore weight of the vehicle decreases based on the type of vehicle in which it is deployed. Further, the assembly time decreases and requirement of fasteners and other connecting parts is minimized without affecting the overall performance of the chassis. Consequently, cost of deployment also reduces.

While the exemplary embodiments of the present invention are described and illustrated herein, it will be appreciated that they are merely illustrative. It will be understood by those skilled in the art that various modifications in form and detail may be made therein without departing from or offending the scope of the invention except as it may be described by the following claims.

We claim:

1. An improved cross member, the cross member comprising:
   at least two heat-treated end-regions; and at least two side faces disposed perpendicularly to top faces of the cross members for surface to surface fitting of the cross members to inner sides of side rails of a vehicle, wherein the at least two end-regions are heat-treated such that the heat-treated end regions of the cross member are extendable to a predetermined portion of the total length of the cross member such that the strength of the end-regions is adaptable to the required yield strength of the cross members for directly and securely fitting onto the side rails of the vehicle.

2. The cross member as claimed in claim 1, wherein the slot is disposed at each of the two heat-treated end-regions of the cross members to provide a passage for coupling with components of the vehicle.

3. The cross member as claimed in claim 1, wherein the cross member comprises a top flange surface disposed at the periphery of a top face of the cross members; and a bottom flange surface disposed at the periphery of a bottom face of the cross members, wherein the top and bottom flange surfaces are flat surfaces disposed parallelly with respect to each other in the cross members for mounting peripheral aggregates on the cross members.

4. The cross member as claimed in claim 1, wherein mid-regions are provided in the cross members between the heat-treated end-regions, the mid-regions including holes that provide a common reference point for use in tooling and manufacturing processes.

5. The cross member as claimed in claim 1, wherein the overall length of the cross members is in the range of between 500 to 1,000 mm and the width of the cross members is in the range of between 110 to 300 mm.

6. The cross member as claimed in claim 1, wherein the cross member is made of steel, the composition of the steel is characterized by alloying elements imparting predetermined mechanical properties to the cross member, and wherein an inherent strength of the steel preferably ranges between 300 and 700 MPa.

7. The cross member as claimed in claim 1, wherein the cross members are manufactured through a partial draw stamping process carried out through Y-shaped depressions provided at the heat-treated end-regions.

8. The cross member as claimed in claim 1, wherein the end-regions of the cross member are heated through selective heat treatment comprising the steps of (a) heating the end-regions to a first pre-determined temperature; (b) rapidly cooling the heat-treated end-regions to a second predetermined temperature; and (c) heating the end-regions to a third pre-determined temperature.

9. The cross member as claimed in claim 8, wherein the first pre-determined temperature ranges between 850 degree centigrade and 1,050 degree centigrade.

10. The cross member as claimed in claim 8, wherein the first predetermined temperature ranges between 900 degree centigrade and 1,000 degree centigrade.

11. The cross member as claimed in claim 8, wherein the first predetermined temperature ranges between 900 degree centigrade and 950 degree centigrade.

12. The cross member as claimed in claim 8, wherein the second predetermined temperature is room temperature.

13. The cross member as claimed in claim 8, wherein the third pre-determined temperature ranges between 300 degree centigrade and 600 degree centigrade.

14. The cross member as claimed in claim 8, wherein for a cross member of length "L", the heat-treated end-regions are extendable to "L/10".

15. The cross member as claimed in claim 8, wherein for a cross member of length "L" the heat-treated end-regions are extendable to "L/2".

16. The cross member as claimed in claim 1, wherein resultant strength of the cross members ranges between 640 MPa and 1,100 MPa.

17. The cross member as claimed in claim 8, wherein strength of the cross members is 640 MPa at the third predetermined temperature of 550 degrees centigrade.

18. The cross member as claimed in claim 8, wherein strength of the cross members is 830 MPa at the third predetermined temperature of 475 degrees centigrade.

19. The cross member as claimed in claim 8, wherein elongation of the base material is maintained within 10% to 20% after the heat treatment of the cross member.

20. The cross member as claimed in claim 1, wherein the heat treated end-regions of the cross-members is extendable to 235 mm.

21. The cross member as claimed in claim 1, wherein the heat treated end-regions of the cross-members is extendable to 400 mm.

22. An improved cross member assembly, the cross member assembly comprising:
   at least two cross members coupled such that the cross member is disposed in a direction facing corresponding parts of the cross member, wherein the at least two cross members are configured to accommodate joining plates across top flange surfaces and bottom flange surfaces.

23. The cross member assembly as claimed in claim 22, wherein the joining plates are at least one of simple plates, cylindrical sleeves, and any other customized mounting plates.

24. The cross member assembly as claimed in claim 22, wherein the joining plates are secured to the cross members using a bolting mechanism.

25. The cross member assembly as claimed in claim 23, wherein the cross members are configured to accommodate peripheral aggregates including at least one of a prop-shaft bearing, a brake valve and the like for proper functioning of a vehicle.

26. The cross member assembly as claimed in claim 23, wherein the cross member assembly is mountable across chassis of heavy commercial vehicles (HCV).

27. The cross member assembly as claimed in claim 23, wherein the cross member assembly is mountable across chassis of light commercial vehicles (LCV).

28. The cross member assembly as claimed in claim 23, wherein the cross member assembly is a modular assembly mountable between two side rails of a ladder frame chassis of a vehicle.

29. The cross member assembly as claimed in claim 23, wherein the at least two cross members are coupled based on at least one of dimensions of a ladder frame chassis of a vehicle, location of the cross member assembly in the ladder frame chassis and a type of vehicle for which the ladder frame chassis is designed.

30. The cross member assembly as claimed in claim 23, wherein the at least two cross members are coupled using a bolting mechanism.

31. The cross member assembly as claimed in claim 23, wherein the at least two cross members are coupled using a riveting mechanism.

* * * * *